Inventors
Joseph E. Jendrisak
and Frank J. Carson
By Nobbe & Swope
Attorneys

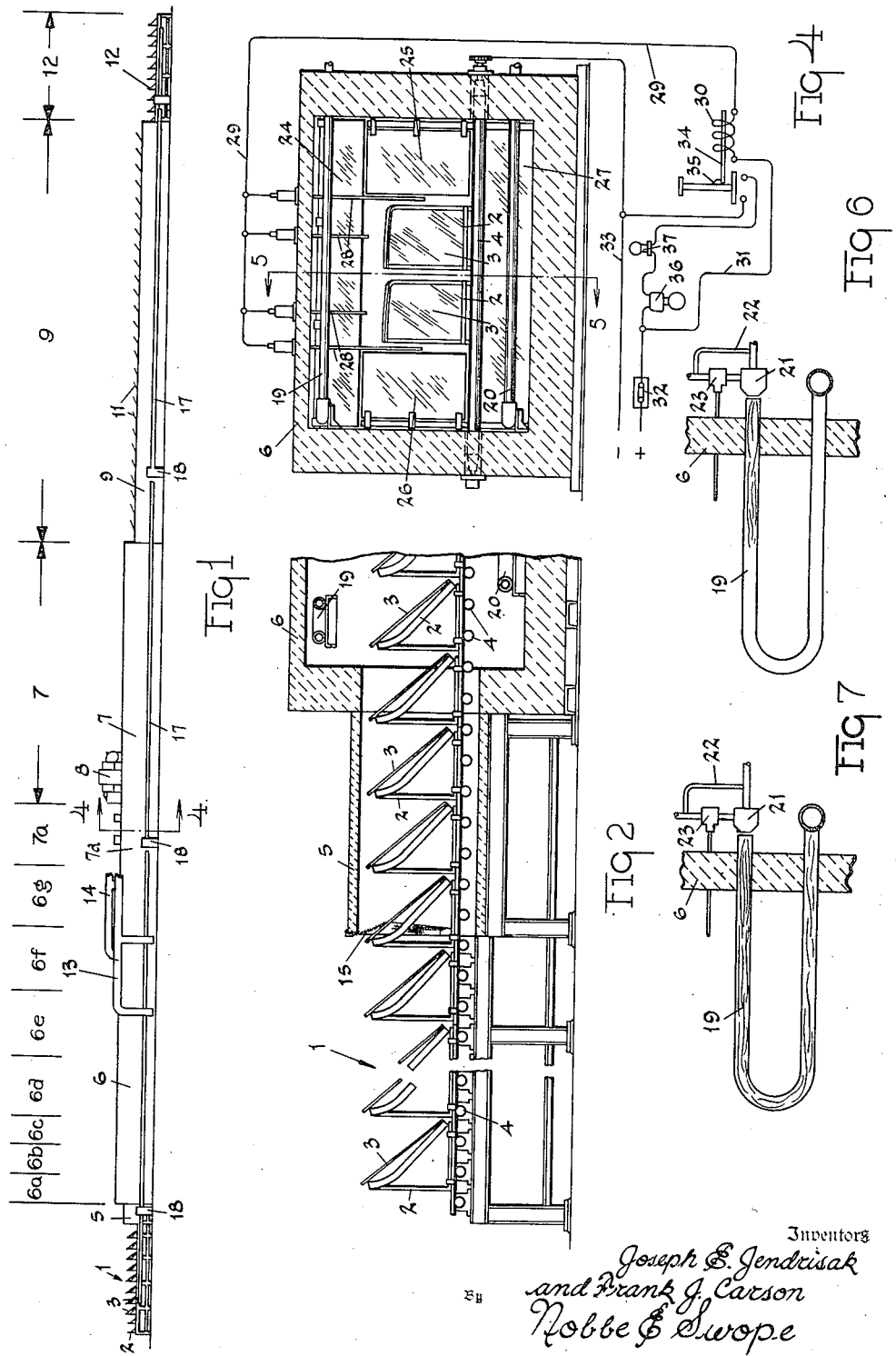
Oct. 16, 1956 — J. E. JENDRISAK ET AL — 2,766,555
GLASS BENDING METHODS AND FURNACES
Original Filed Dec. 22, 1947 — 6 Sheets-Sheet 1
Inventors
Joseph E. Jendrisak
and Frank J. Carson
By Nobbe & Swope
Attorneys Oct. 16, 1956　　　J. E. JENDRISAK ET AL　　　2,766,555
GLASS BENDING METHODS AND FURNACES
Original Filed Dec. 22, 1947　　　　　　　　　　6 Sheets-Sheet 2

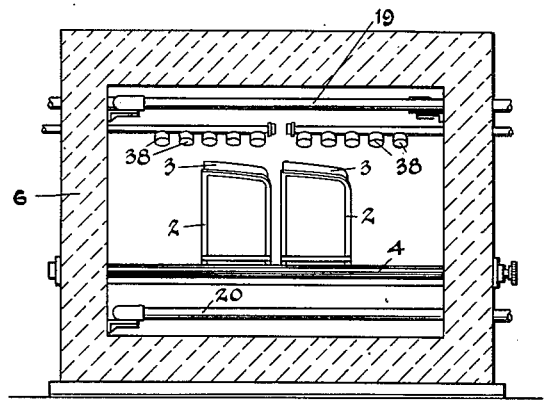
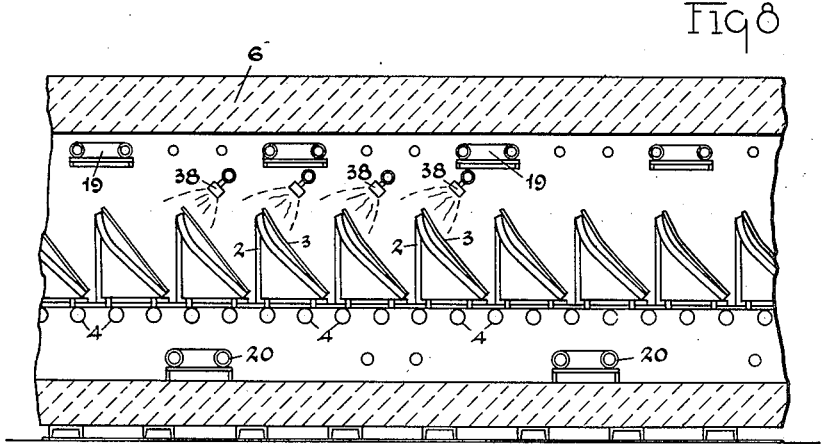
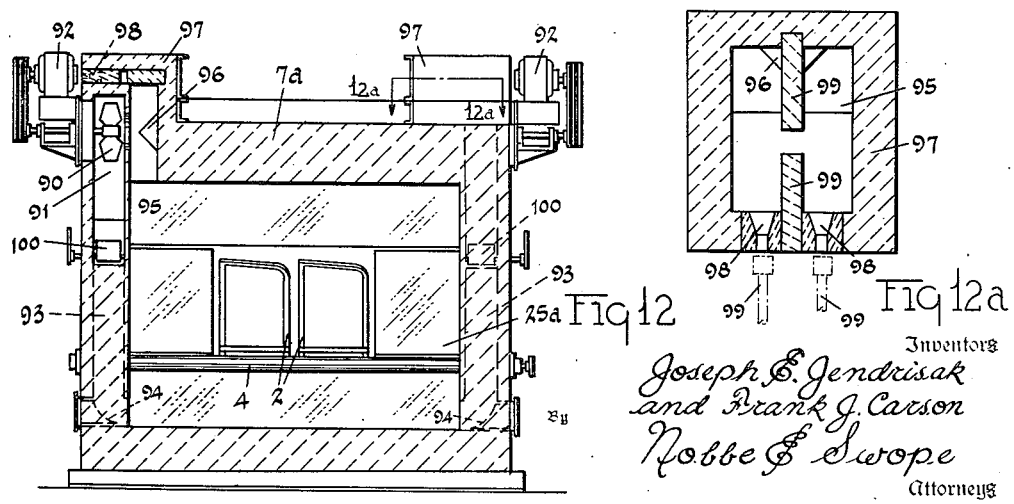

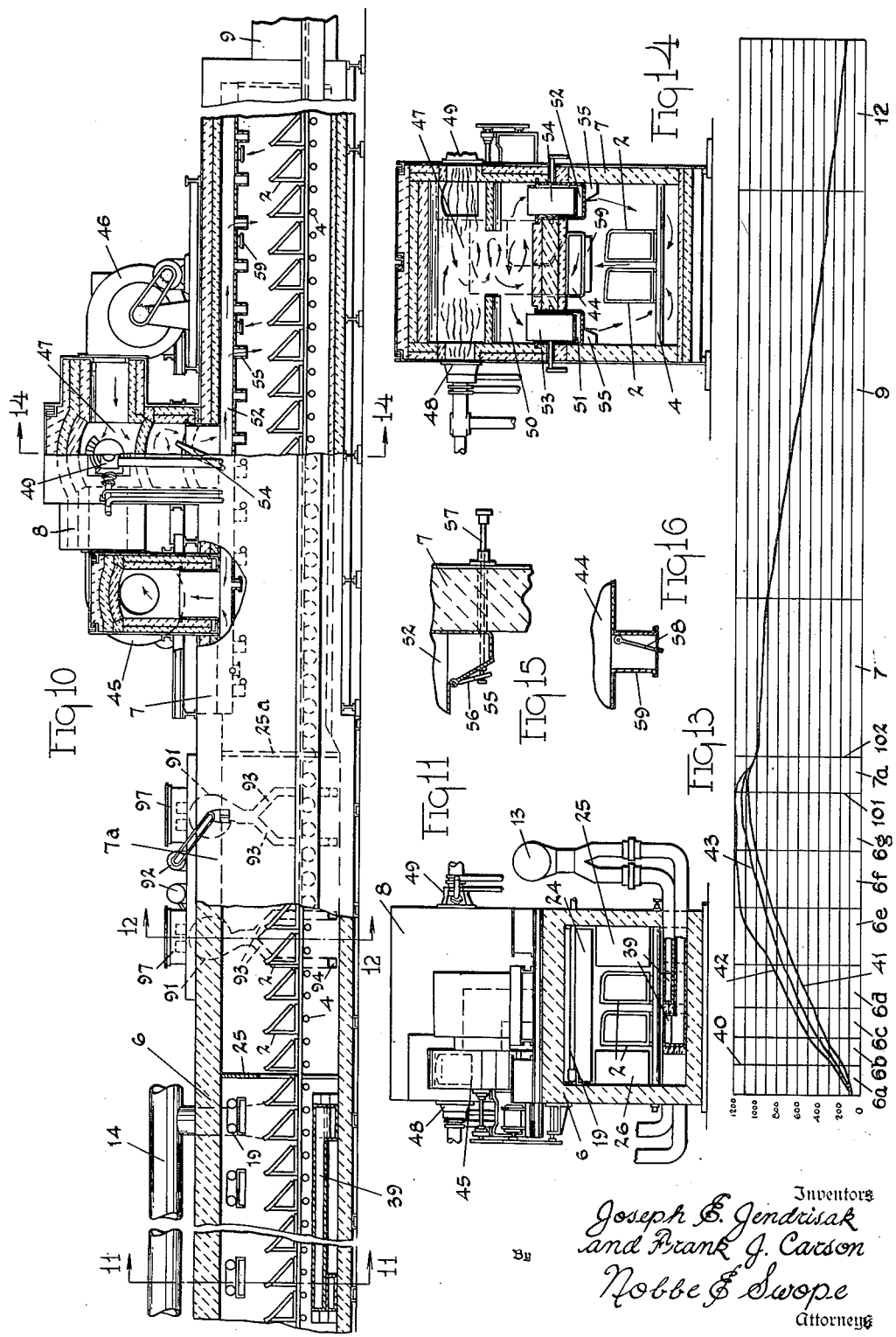

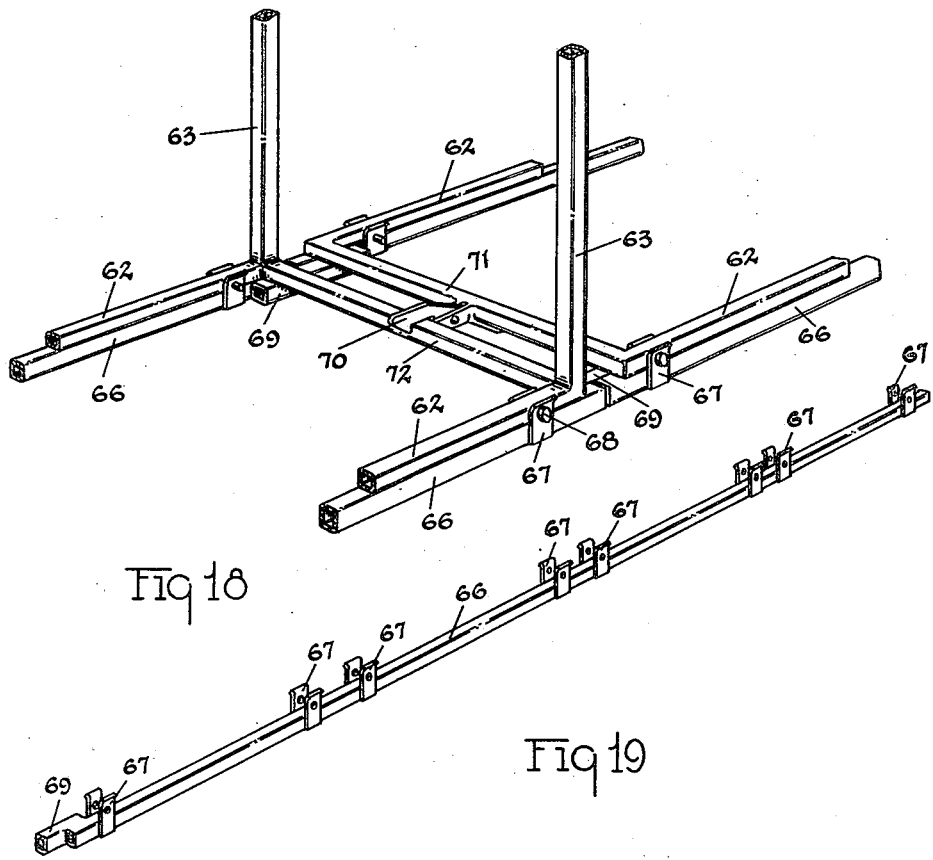

Oct. 16, 1956 J. E. JENDRISAK ET AL 2,766,555
GLASS BENDING METHODS AND FURNACES
Original Filed Dec. 22, 1947 6 Sheets-Sheet 6
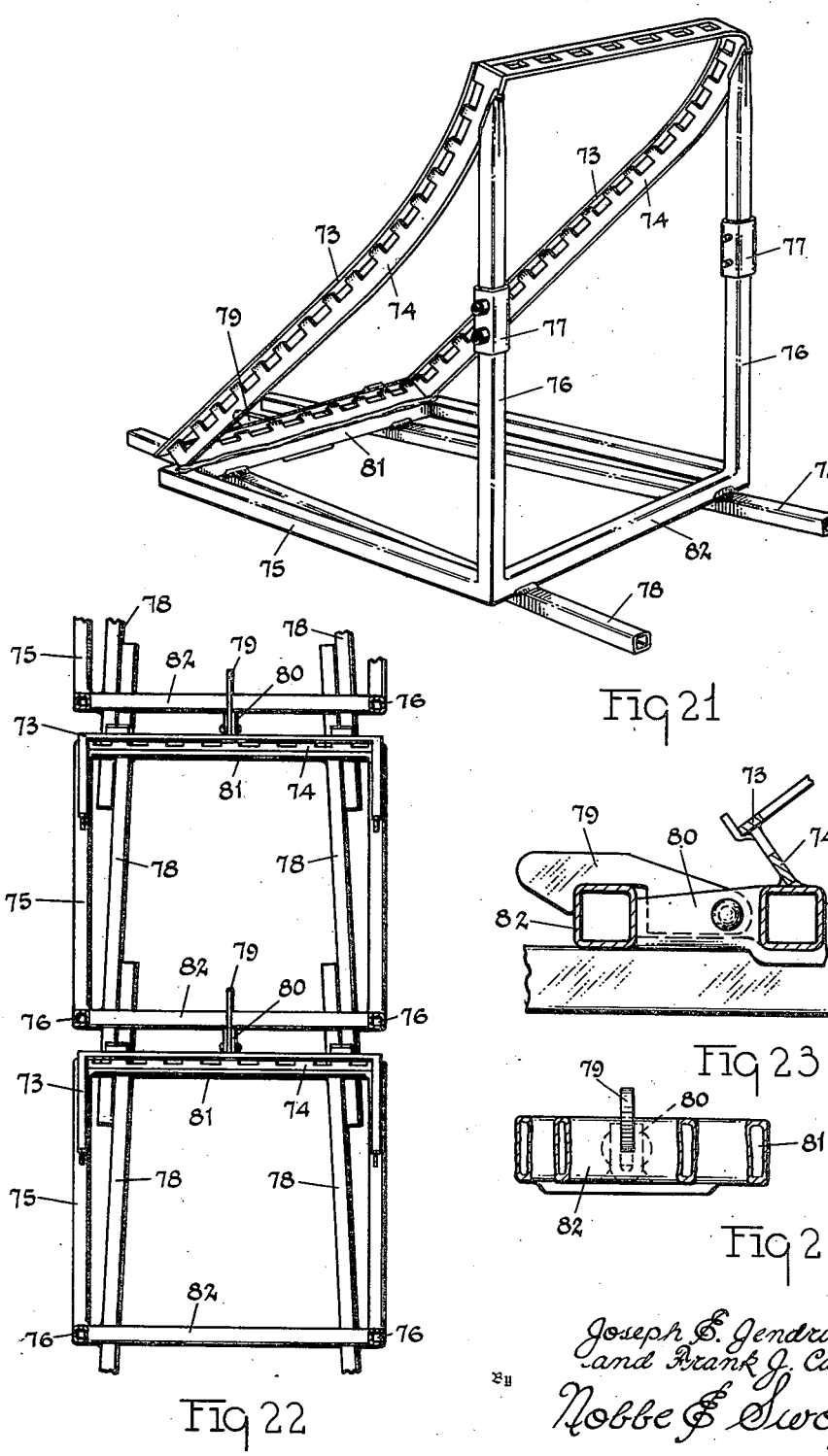
Inventors
Joseph E. Jendrisak
and Frank J. Carson
By Nobbe & Swope
Attorneys

United States Patent Office 2,766,555
Patented Oct. 16, 1956

2,766,555

GLASS BENDING METHODS AND FURNACES

Joseph E. Jendrisak, Rossford, and Frank J. Carson, Toledo, Ohio, assignors to Libbey-Owens-Ford Glass Company, Toledo, Ohio, a corporation of Ohio Continuation of abandoned application Serial No. 793,144, December 22, 1947. This application November 1, 1951, Serial No. 254,273

14 Claims. (Cl. 49—7)

This invention relates to a method of and apparatus for use in bending glass sheets and in particular to a method of bending glass sheets in which different portions of a glass sheet being bent are subjected to different temperatures.

This application is a continuation of our copending application Serial No. 793,144, now abandoned, filed December 22, 1947.

The improved method avoids many of the difficulties of the older glass bending methods by localizing the heat applied to the glass sheets in those portions of the sheet that are to be bent and by maintaining the remainder of each of the glass sheets at a temperature close to but less than the temperature at which the glass softens. This result is accomplished by providing a heating chamber in which the atmosphere is maintained substantially quiescent and in which most if not all of the heat is supplied near the top of the heating chamber so that a substantial heat gradient exists between the bottom and the top of the heating chamber. The molds which carry the glass sheets through the furnace are arranged so that those portions of a glass sheet to be bent extend into the hotter portion of the chamber.

The improved method is especially useful in the production of curved window glass such as is used in automobiles and more particularly to curved window glass in which the curvature is confined to a relatively small portion of the window area. Such a window glass may, for example, be used as the windshield of an automobile with a large relatively flat portion of the glass sheet extending from the center line of the car to the side where it is curved sharply to blend into the side contour of the automobile body. Such a configuration is difficult to produce by ordinary glass bending methods because the large, relatively flat portion of the glass sheet tends to sag and bend out of shape before the end of the sheet softens sufficiently to bend to the relatively sharp curve required. Any support that may be added to a mold to carry the relatively large flat portion of the glass to prevent it from sagging leaves a mark in the surface of the glass, thus rendering the glass sheet commercially unacceptable.

It is, therefore, an object of this invention to provide a glass bending method in which different portions of a glass sheet being heated for bending are subjected to different temperatures so that only those portions of the sheet that are to be bent are actually heated to softening temperature.

Another object of the invention is to provide a heating chamber in which the majority of the heating elements are located near the ceiling of the chamber to reduce convection currents within the chamber and thereby to produce a substantial temperature gradient between the upper and lower portions of the chamber.

A still further object of the invention is to further increase the temperature gradient in a vertical direction by the introduction of cooling means in selected portions of the chamber.

An ancillary object is to provide radiant heating units for directing the heat toward the portions of the glass sheets to be bent and to position the glass sheets within the chamber so that a portion of one sheet of glass shields a portion of the next sheet of glass to reduce the heat input and thus the temperature rise of the portions of the glass sheets that are not to be bent.

More specific objects and advantages are apparent in the following description in which reference is made to the accompanying drawings.

In the drawings:

Figure 1 is a side elevation of a tunnel-type furnace suitable for carrying out the invention.

Figure 2 is a vertical longitudinal section of the loading station and entrance to the heating chamber of the furnace.

Figure 4 is a transverse vertical section taken substantially along the line 4—4 of Figure 1.

Figures 6 and 7 are plan views of one of the heaters for the heating chamber of the improved furnace.

Figure 8 is a longitudinal vertical section of a portion of the furnace located to the right of that shown in Figure 2.

Figure 9 is a transverse section taken through the portion of the heating chamber shown in Figure 8.

Figure 10 is a side elevation, partly in section, of the midportion of the improved furnace.

Figure 11 is a transverse section taken substantially along the line 11—11 of Figure 10.

Figure 12 is a transverse vertical section taken along the line 12—12 of Figure 10.

Figure 12a is a horizontal section taken along the line 12a—12a of Figure 12.

Figure 13 is a chart showing the temperatures of different portions of a glass sheet during its progress through the furnace.

Figure 14 is a transverse vertical section taken substantially along the line 14—14 of Figure 10.

Figure 15 is a fragmentary view showing a portion of the distributing duct system employed to circulate heated gas in the annealing chamber of the furnace.

Figure 16 is a fragmentary vertical section of another portion of the circulating system.

Figure 18 is a perspective view showing the cooperation between the ends of adjacent sections of molds to form a chain of molds extending throughout the length of the furnace.

Figure 19 is a perspective view of one of the side rails of a section of molds.

Figure 20 is a fragmentary plan view of the adjacent corners of two adjacent sections of molds.

Figure 21 is a perspective view of another form of mold suitable for use in the furnace.

Figure 22 is a plan partly in section illustrating the interlocking of the molds shown in Figure 21 to form a continuous chain.

Figure 23 is a fragmentary elevation partly in section showing a latch for linking adjacent mold sections together when forming a chain of molds.

Figure 24 is a fragmentary end elevation of the latch shown in Figure 23.

Figure 3:
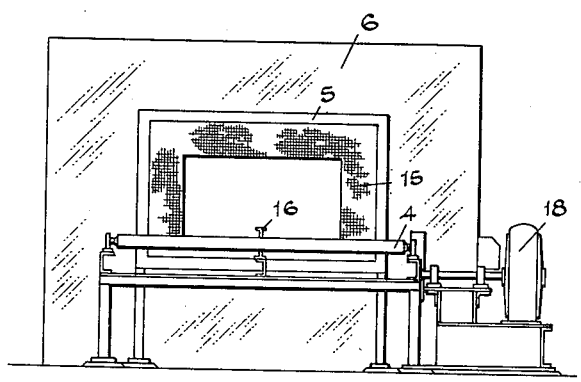
Figure 3 is an end elevation of the entrance end of the furnace.
Figure 5:
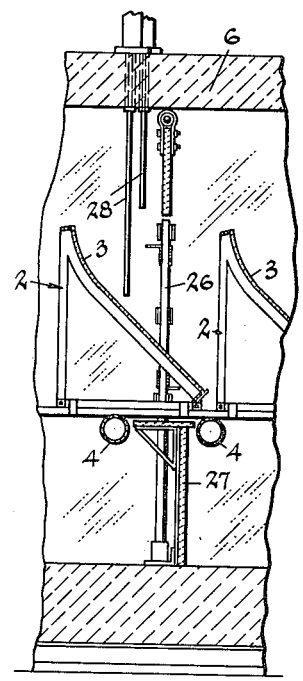
Figure 5 is a fragmentary vertical longitudinal section taken substantially along the line 5—5 of Figure 4.

These specific figures and the accompanying description are intended merely to illustrate the invention but not to impose limitations on the claims.

The improved method for bending glass sheets is adaptable to either an intermittent or a continuous process because, while it requires that the various portions of the glass sheet be subjected to different temperatures, the regions of different temperature may extend parallel to the path of a continuously moving mold which supports the glass sheets with the portions to be bent extending into the region having the higher temperature. The temperatures for the various portions of the glass sheet are selected so that those portions to be bent reach the softening temperature of the glass while the remaining portions of the glass sheets reach a temperature somewhat less than that at which the glass softens. The maximum difference in temperature between the various portions of the glass sheet need not exceed 150° F. This variation in temperature from one portion of the glass sheet to another will not cause strain or breakage as long as the portion of the glass heated to a particular temperature extends as a band or strip clear across the width of the glass sheet.

An improved furnace suitable for carrying out the method of the invention includes a heating chamber in which the heating means are located in one portion only of the chamber to produce a substantial temperature gradient in a direction transverse to the path of the glass carrying molds. Preferably, the type of heating means and its location is selected to avoid agitating the atmosphere within the heating chamber or setting up any convection currents therein. The maintenance of a quiescent atmosphere facilitates the maintenance of a substantial temperature gradient and thus permits the portions of the glass sheets to be subjected to different temperatures during their passage through the heating chamber.

The improved furnace includes an annealing chamber in which a heated atmosphere is circulated to equalize the temperatures in the various portions of the glass sheets to avoid setting up any strains within the glass and to gradually lower the temperature in the glass.

Following the annealing chamber the glass passes through a ventilated cooling chamber where its temperature is lowered sufficiently so that it may be safely handled.

Referring now to the accompanying drawings, the improved furnace for carrying out the method of the invention is illustrated in Figure 1. The improved furnace includes a loading station 1 where molds 2 are loaded with glass sheets 3. The loaded molds 2 travel on a series of conveyor rolls 4 (Figure 2) that forms a conveyor extending throughout the length of the furnace. From the loading station 1 the molds pass through a short entrance tunnel 5 and enter a heating chamber 6 which, for purposes of temperature control, is divided into seven zones 6a, 6b, 6c, 6d, 6e, 6f and 6g, each having its own temperature control.

As the molds leave the heating chamber 6 they pass into an annealing chamber 7, the atmosphere of which is heated and circulated by a burner and fan assembly 8. The temperatures within the annealing chamber 7 are selected so that at the entrance to the chamber the temperature is approximately 100° F. below that of the heating chamber. The circulation is controlled so that the temperature at the exit end of the annealing chamber is slightly lower than that at the entrance end so that the bent glass is annealed and partially cooled within this chamber.

For proper annealing the glass is cooled slowly. Therefore, the temperature in the annealing chamber 7 is maintained nearly equal to that of the glass and molds. To maintain accurate dimensions in the bent glass it is desirable, as soon as the glass is bent, to set it by a sudden "freezing" action which, as the glass temperature falls below the bending point, effectively prevents any further bending or sagging of the glass. This is preferably done by rapidly cooling the glass through a temperature change of approximately 100° F. as soon as it leaves the heating chamber 6. If the glass is thin the temperature difference between the glass temperature and the annealing chamber gas temperature may provide enough cooling. Heavier sections of glass require a lower gas temperature to secure the desired "freezing" or setting action. This can be provided by interposing a "setting" chamber 7a between the exit of the heating chamber 6 and the annealing chamber 7 and maintaining the atmosphere of this chamber at a temperature that cools the glass to approximately 1000° F. during its passage therethrough.

From the annealing chamber 7 the molds go directly into a ventilated cooling chamber 9 arranged to draw room temperature air into the chamber from its exit end 10 and to discharge the heated air through trap doors 11 in the roof of the chamber. The amount of circulation of cooling air through the cooling chamber 9 induced by the heated glass and molds is normally sufficient but if necessary the circulation may be increased by a blower arranged to exhaust the heated air from the cooling chamber at a point near the annealing chamber 7.

As the molds 2 leave the cooling chamber 9 they cross an unloading station 12 where the bent glass sheets are removed from the molds and prepared for shipping. The molds 2 are then returned to the loading station 1 to be reloaded and sent through the furnace again.

One of the features of the improved furnace is its ability to produce and maintain, in a direction transverse to the path of the molds, a substantial temperature gradient within the heating chamber 6. As long as the molds and the glass are much colder than the atmosphere of the furnace it is relatively easy to maintain such a temperature gradient. In the next to the last and the last, i. e. the sixth and seventh, zones of the heating chamber 6 the molds and glass are approaching the temperature of the furnace atmosphere so that the temperature gradient tends to decrease. This decrease in temperature gradient is prevented by cooling ducts installed in the floor of the heating chamber 6 through which cool air is circulated by a blower connected to ducts 13 and 14 leading to the cooling ducts. The improved furnace thus includes a heating chamber having means for maintaining in a quiescent atmosphere a substantial temperature gradient between different regions of the chamber.

Referring to Figure 2, the molds 2 loaded with the glass sheets 3 enter the heating chamber 6 through the entrance tunnel 5 the mouth of which is partially closed by a curtain or baffle 15 that serves to maintain the quiescence of the atmosphere within the heating chamber 6 and to prevent loss of heat past the incoming molds. The curtain 15 may if desired be made of a heavy glass cloth that is supported at the top and sides of the mouth of the entrance tunnel 5 and that is allowed to drag over the tops and sides of the incoming molds. A similar result may be obtained by employing a metallic baffle having a size that will just admit the molds without rubbing on them. With either type of construction the desired end result is the prevention of heat loss from the furnace, such heat loss being objectionable both from the standpoint of operating economy of the furnace and of the comfort of the workmen employed to load the glass onto the molds.

Referring to Figure 3, which shows the loading station in end elevation, the curtain 15 is shown as limiting the entrance space through which the molds may enter the tunnel 5 leading to the heating chamber 6. In order that the molds be properly guided into the entrance space and started straight on the conveyor rollers 4, a guide rail 16 is positioned along the longitudinal center line of the conveyor and the molds as they are placed on the conveyor are pushed against the guide rail 16 which thus serves to align them with each other and with the opening through the curtain 15.

Referring to Figures 1 and 3, the conveyor rollers 4 are driven by a transmission system including longitudinally extending shafts 17 and variable speed motor drives 18. The drive to the rollers 4 is divided into sections so that the speed of the rollers in the various chambers may be adjusted to regulate the speed of the molds through the furnace and thus control the time during which the glass is subjected to the temperature of each chamber. The drives are interlocked by means of overrunning clutches or similar equipment so that no portion of the conveyor may be operated at a speed greater than that of a succeeding portion of the conveyor. It is, however, possible to operate the succeeding sections at a faster rate. This interlocking arrangement is necessary to avoid any piling up of the molds within the furnace which would occur if the molds were carried into one section at a rate faster than they were carried through that section. It is always permissible to operate the succeeding sections of the conveyor at higher speeds because such operation merely tends to increase the spacing between the molds to accommodate the change in speed.

Figure 2 also shows the location of the heating elements included within the heating chamber 6. As shown in Figures 2, 6 and 7, the heating elements consist of U-tubes 19 and 20 extending across the heating chamber 6 with the ends of the tubes extending through the wall of the chamber. The tubes 19 are located near the top of the chamber while the tubes 20 are located near the bottom of the chamber beneath the conveyor rolls 4. The tubes 19 and 20 are preferably gas fired and to this end each of the tubes is provided with a burner 21 that is continuously supplied with fuel through the parallel combination of a bypass line 22 to maintain a supply of heat that is not quite sufficient to maintain the desired temperature within the chamber and a thermostatically controlled valve 23 to supply additional fuel to the burner 21 as may be required to raise its temperature to the desired operating condition. The tubes 19 are thus operated at either low-fire or high-fire condition as determined by the temperature at the thermostat of the thermostatically controlled valve 23. Operation at either of two levels of heat input provides a more even heat input into the furnace than is possible to obtain if the burners are turned completely off as soon as the required temperature is reached.

Referring now to Figure 4, which is a cross section of the last zone of the heating chamber 6 looking toward the annealing chamber 7, a baffle plate 24 suspended from a horizontal rod near the top of the chamber extends downwardly with its bottom edge just high enough to clear the tops of the molds 2 as they progress through the furnace. Side baffle plates 25 and 26 hinged from the sides of the chamber extend from the lower edge of the upper suspended baffle plate 24 to the level of the conveyor rolls 4. These pivotally mounted baffle plates in combination with a wall 27 extending from the floor of the chamber nearly to the top of the conveyor rolls 4 provide a partition between the heating chamber 6 and the setting chamber 7a (or the annealing chamber 7 if no setting chamber is provided) to prevent the circulation of the atmosphere in the setting or annealing chamber from disturbing the quiescence of the atmosphere within the heating chamber. A similar partition separates the setting chamber 7a from the annealing chamber 7. An opening is left through each of these partitions of a size to accommodate the molds with the glass sheets as long as the molds are following their intended path. Some clearance is provided between the molds and the baffle plates to accommodate a small amount of misalignment of the molds but this clearance must be kept reasonably small or there will be too much leakage or circulation of gas from one of the chambers into the other. The baffle plates are pivotally mounted so that in the event a mold strays from its intended path and strikes the baffle, the baffle will swing back out of the way and permit the mold to continue on its way into the next section of the furnace.

In order that such straying of the molds shall not go unnoticed, a plurality of electrically charged rods 28 are freely suspended from the top of the chamber and hang in position to contact any mold that has strayed far enough to be in danger of striking one of the baffle plates. The rods 28 are connected through a lead 29, a solenoid coil 30, a lead 31, and a switch 32 to a source of electrical power. The other side of the source of electrical power is grounded and is connected through a lead 33 to the conveyor rollers 4. The rollers 4 and the molds, which preferably are made of heat resistant steel, are conductors of electricity so that in the event that a mold contacts one of the rods 28 a circuit is completed and the solenoid 30 is energized. When the solenoid 30 is energized it withdraws its armature 34 from beneath a latched contact member 35 thereby allowing the contact member to drop and close a circuit that includes a warning bell 36 and warning light 37. The warning bell 36 and lamp 37 operate continuously until the misalignment of the molds is corrected and the latched contact member 35 is reset.

This warning system may be repeated as required throughout the length of the furnace as a safety measure and as an aid to supervising the operation of the furnace.

Referring now to Figure 8, which is a longitudinal vertical section of the fifth zone of the heating chamber 6, the molds 2 are shown being carried along by the conveyor rolls 4 while the glass sheets 3 carried on the molds 2 are subjected to heat from the burner tubes 19 and 20 and from a series of radiant heaters 38 that are directed broadside against the upper portions of the glass sheets 3. The radiant heaters 38 serve to augment in localized areas the heating of the glass produced by the gas-fired tubes 19 and 20.

The gas-fired heater tubes 19 are spaced uniformly throughout substantially the entire length of the heating chamber 6 and a relatively smaller number of the heating tubes 20 are located along the floor of the chamber. The tubes 19 tend to maintain a high temperature at the top of the chamber. The heat spreads downwardly through the atmosphere in the heating chamber by conduction and in this way produces a substantial heat gradient extending from the top to the bottom of the heating chamber. In the absence of the heater tubes 20 located beneath the conveyor the temperature gradient in the first four or five heating zones may be greater than desired. This is because the cool incoming molds and glass extract so much heat from the space immediately above the conveyor that there is insufficient conductive heat flow from the burner tubes 19 to maintain the temperature desired at the conveyor. Therefore, in these zones additional heat is supplied by the burner tubes 20 beneath the conveyor to reduce the temperature gradient to the desired amount.

In the example shown, the bend to be produced in the glass is quite sharp and is confined to a relatively small area of the sheet. In this situation better results are obtained if additional heat is applied directly to the glass at the bending region. The radiant heaters 38 provide this additional heat. Further concentration of the heating effect of the radiant heaters 38 is obtained by orienting the molds so that the upper portions of the glass sheets carried on one mold shield the lower portions of the glass sheets carried on a succeeding mold and thereby confine the radiant heating effect to the upper part of each sheet.

As the glass passes through the fifth zone of the heating chamber 6 and is subjected to the heat from the radiant heaters 38, it softens in its upper portion and starts to bend into conformity with the shaping surfaces of the molds. The bending operation is completed as the molds pass through the sixth and seventh zones of the heating chamber 6, which zones are shown at the left end of Figure 10. Since the glass to be bent has already reached its softening temperature as it approaches the sixth heating zone it is only necessary to maintain the bending conditions through zones 6 and 7. However, by this time there is considerable conduction of heat through the glass and through the mold members tending to heat the lower portion of the glass and the lower part of the mold. This heating is undesirable when the bottom portion of the glass sheets is to remain substantially flat.

The temperature gradient to maintain bending conditions in one portion of the glass sheet and non-bending conditions in the remainder of the glass sheet is maintained throughout these last two zones by providing cooling ducts 39 extending lengthwise of these zones of the chamber and connecting these cooling ducts to the ducts 13 and 14 that are continuously supplied with cool air. The furnace illustrated accommodates two series of molds in parallel relation and, for best results, a cooling duct 39 is located beneath the path of each series. The cooling ducts 39 extract enough heat by conduction from the lower portions of zones 6 and 7 of the heating chamber to maintain a sufficient temperature gradient in these zones so that the lower portions of the glass sheets carried on the molds do not reach their softening temperature. In these zones the heating tubes 19 in the upper part of the chamber constitute heating means for heating that part of the chamber while the cooling ducts 39 constitute heat extracting means located in at least a portion of the lower part of the chamber and which cooperate with the heating means to produce regions of different temperatures in the atmosphere of the chamber.

Figure 13 is a temperature chart to show the temperature of the different portions of the glass sheet during the bending operation. Even though the temperature is uniform throughout the glass sheet as it enters at the inlet end of the heating chamber 6 the effect of the temperature gradient is apparent when the glass reaches the end of the first zone 6a represented by the vertical line 40. At this stage the temperature at the lower end of the glass sheet, which temperature is represented by the line 41, is considerably less than the temperature at the upper end of the sheet, which is represented by the line 42. The temperature at the center of the sheet is intermediate the temperatures at the ends and is represented by the line 43 in the chart. As the molds progress through the second, third and fourth zones 6b, 6c and 6d of the heating chamber 6 the temperature of the glass rises and the difference in temperature between the bottom and the top increases slightly. Throughout these regions heat is supplied both to the top and to the bottom of the heating chamber in different amounts so as to maintain the temperature differential and thus the temperature attained by the various portions of the glass sheet.

In the fifth zone 6e the radiant heaters 38 supply additional heat to sharply raise the temperature at the top of the sheet and to increase the temperature difference between the top portions of the sheets of glass and the intermediate and lower portions. This temperature differential is reduced somewhat through the sixth and seventh zones 6f and 6g. In these zones the temperature would tend to equalize throughout the sheet of glass were it not for the cooling effect of the air ducts 39.

By maintaining the difference of temperatures to which the portions of the glass sheet are subjected, only those portions that are to be bent are actually raised to softening temperatures. This materially simplifies the design of the mold shaping surface because it eliminates the necessity of supporting the large flat area of the glass to prevent it from sagging as it would if all of the glass were subjected to the bending temperature.

The bending of the glass is substantially complete as the molds leave the last, i. e. the seventh, zone of the heating chamber and pass through the partition or baffles separating the heating chamber from the succeeding parts of the furnace. To prevent any further sagging or bending of the glass it is desirable to set or freeze it into its bent shape as quickly as possible. This setting or freezing action occurs when the temperature of the glass is dropped to approximately 1000° F. as it is subjected to a heated atmosphere that is relatively cool with respect to the glass. Since the temperature of the atmosphere providing sufficiently rapid cooling is less than the temperature of the gas in the annealing chamber 7, it is desirable to keep it separated from the atmosphere in the annealing chamber. For this purpose the setting chamber 7a is inserted between the heating chamber 6 and the annealing chamber 7 and is separated from the heating chamber 6 by the partition including the baffles 25 and from the annealing chamber 7 by a similar partition including baffle plates 25a. The relative position of this chamber with respect to the remainder of the furnace is indicated in Figures 1 and 10.

Since the purpose of this chamber is to equalize the temperatures throughout the area of the glass sheets as well as to drop the temperature of the hotter portions of the sheet to prevent any further bending, the atmosphere of the setting chamber 7a is circulated and its temperature controlled to secure the proper rate of cooling. Circulation is accomplished by fans 90 that are mounted in involute shaped recesses 91 provided in the walls of the furnace and that are belt driven by motors 92 mounted above the side walls of the furnace. The fans 90 serve to drive air downwardly through ducts 93 that discharge into the setting chamber 7a through openings 94 located near the floor of the setting chamber. As the air rises through the chamber it picks up heat from the heated glass and molds and is finally drawn out through ducts 95 leading out of the ceiling of the setting chamber 7a. The ducts 95 lead upwardly to the inlets to the fan housings 91 while extensions of the ducts 95 lead on upwardly past the fan housings. Deflectors 96 are installed in the ducts 95 to direct the air toward the inlets of the fans. Where air circulation above is insufficient to give the required cooling fresh air may also be drawn downwardly through burner housings 97 erected from the roof of the furnace immediately above the fans 90. This incoming fresh air is also directed into the inlets of the fans 90 by the deflectors 96 and is mixed with the hot air drawn from the setting chamber 7a as it is driven downwardly through the ducts 93 leading to the lower part of the chamber. The amount of fresh air admitted and mixed with the hot air from the chamber is selected so that under ordinary conditions the temperature of the gas is lower than that required to secure satisfactory cooling.

The temperature in the chamber may be further controlled by supplying heat to the incoming fresh air by means of gas burners 98 that are fed from fuel supply lines 99 and that discharge directly into the fresh air ducts 97 so that the heated gas from the combustion of fuel mixes with the fresh air in an amount sufficient to obtain the desired temperature. It is preferable to add heat in this manner if automatic control is contemplated because it is easier to control the flow of fuel to the burners 98 than it is to control a damper or shutter to regulate the amount of fresh air used.

The space at the upper ends of the upper part of the ducts 95 and the connected space extending over the wall of the furnace toward the burners 98 is divided by a partition 99 to permit further control of the mixing of the fresh air with the heated products of combustion from the burners 98. A gap is left in the partition 99 so that in the event only one of the burners 98 is employed and fresh air is admitted through the other, the incoming fresh air will not interfere with the proper combustion of the fuel but rather is allowed to mix with the products of combustion after the burning is completed.

It will be noticed from Figure 10 that the ducts 93 leading downwardly from the fan assembly 91 are forked and that the forked ends discharge into the chamber at spaced apart points. Damper vanes 100 located at the fork of the ducts 93 serve to distribute the relatively cool mixture of fresh air and heated gas from the fan 90 between the branches of the ducts 93 as may be necessary to maintain proper temperature distribution along the length of the chamber.

Referring to Figure 13, the temperature chart, the setting chamber is indicated by the space 7a between lines 101 and 102. Within this space it will be noticed that the temperature at the bottom of the glass sheets, as indicated by the line 41, is lowered a small amount while the temperature at the top of the sheet of glass, as indicated by the line 42, is lowered a larger amount, so that, as the glass leaves the chamber, it is approximately equal to the temperature of the lower part of the sheet of glass.

As the glass enters the annealing chamber 7 the temperatures of the different portions of the glass sheet are still further equalized by the circulation of the atmosphere within the annealing chamber. This is indicated in the temperature chart (Figure 13) where the lines 41, 42 and 43 merge. From this point on the temperature of the glass is slowly lowered to about 900° F. as it leaves the annealing chamber and enters the cooling chamber. The temperature of the glass continues to drop as the molds progress through the cooling chamber 9 to the unloading station at the discharge end of the furnace.

The annealing chamber 7 of the furnace is shown partly in side elevation and partly in section in Figure 10 and in transverse section in Figure 14. Referring to Figure 14, the atmosphere within the annealing chamber 7 is drawn upwardly past the molds and into a duct 44. The duct 44 leads to the inlets of either of a pair of motor driven blowers 45, 46 that discharge into a combustion chamber 47 mounted above the annealing chamber 7. The combustion chamber 47 is fed by gas burners 48 and 49 and the heated products of combustion along with the air supplied by the blowers 45 and 46 is discharged downwardly through a mixing chamber 50 leading to discharge ducts 51 and 52. The entrances to the ducts 51 and 52 are controlled by damper vanes 53 and 54. The ducts 51 and 52 extend along the upper corners of the annealing chamber 7 and are each provided with a plurality of depending pockets 55 that open toward the central part of the annealing chamber. The opening from each of the pockets 55 is provided with a door 56 (Figure 15) which when adjusted by means of a rod 57 extending through the wall of the annealing chamber 7 controls the amount of heated air discharged from the duct 51 or 52 through that particular pocket. The doors 56 controlling the flow of air from the combustion chamber in combination with flapper plates 58 mounted in downwardly directed lead-in passages 59 of the duct 44 provide control of the circulation and temperature distribution of the atmosphere or air within the annealing chamber 7 so that the glass is cooled uniformly without chilling any portion of it.

From the annealing chamber 7 the molds carrying the glass pass into the cooling chamber 9 where the glass is cooled sufficiently to be handled at the unloading station. The only requirement to be met in the cooling chamber is that the glass shall be protected from sudden drafts of cold air that might either break it or produce uneven cooling that leaves internal stresses in the glass.

While the apparatus disclosed is particularly well adapted for carrying out the improved method of bending glass sheets the method is not confined to this particular organization of structure. Any arrangement that serves to produce a temperature differential extending in a direction such that a glass sheet to be bent may be oriented in the same general direction with the portions to be bent located in the hotter regions may be used to confine the bending conditions with respect to temperature to those portions of the glass sheet that are to be bent. This method of confining the bending temperature to a portion of the glass sheet materially simplifies the problem of maintaining unimpaired the surface conditions and optical qualities of the unbent portions of the glass sheets.

The conveyor for transporting the molds through the improved furnace consists of a series of rollers 4 each of which is power driven and serves to push the mold along. There is nothing to confine the molds to their intended path. In order to facilitate the passage of the molds through the furnace without their becoming misaligned or requiring any guiding means other than the rail 16 at the loading station means are provided on each mold or section of molds to interconnect the molds into an endless chain extending throughout the length of the furnace. As the molds are unloaded at the unloading station they are disengaged from the chain and returned to the loading station where they are again engaged each with the preceding mold. By constructing and operating the molds in this manner it is unnecessary to modify the internal structure of the furnace when changing from one mold size to another.

Figure 17:
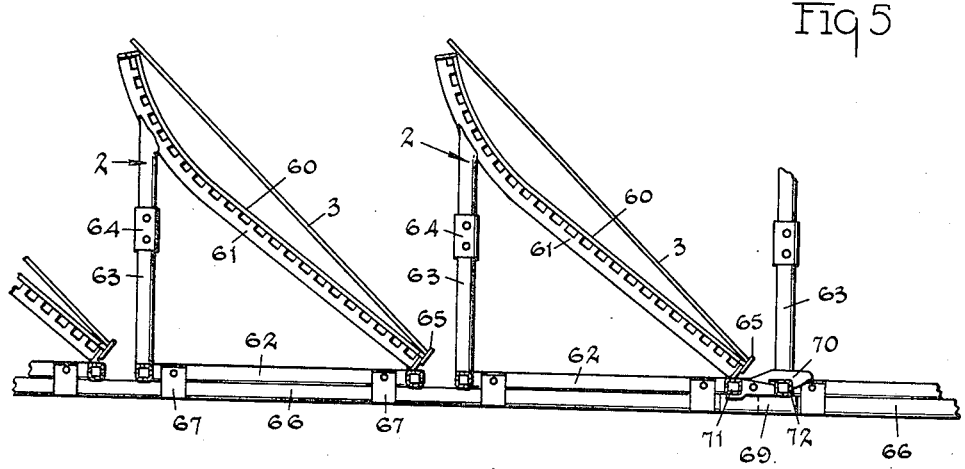
Figure 17 is a side elevation of a mold assembly suitable for use in the furnace.

The improved molds are shown partly in section in Figure 17. Each individual mold includes a shaping surface 60 that is part of a frame 61 conforming to the marginal area of a sheet of glass after the bending operation has been completed. The frame 61 of each mold is supported in an inclined position from a base 62 with the lowermost portion of the frame 61 in contact with the base 62 and with the other end of the frame 61 carried on uprights 63 erected from the base 62. Each of the uprights 63 is divided into two parts connected by a sleeve coupling 64 whereby the lengths of the uprights 63 may be adjusted as required to square the mold and to counteract any warping effect that may result from the repeated heating and cooling of the mold during its use. Prior to the bending operation the glass sheets 3 are supported in bending relation to the shaping surface 60 with the lower edge of the sheet 3 resting against a strip 65 at the lower end of the frame 61 and with the upper end of the glass sheet 3 slightly overhanging and resting against the upper end of the frame 61. During the bending operation as the upper end of the glass sheet 3 softens the sheet sags until it is supported on the shaping surface 60.

The molds 2 are assembled in groups or sections by means of rails 66 each of which is fitted with a plurality of upwardly extending tabs 67 arranged to engage the side rails of the base 62 and to be secured thereto by means of pins 68. As shown in Figure 19, the rail 66 has eight of the tabs 67 and thus provides accommodations for four of the molds which when assembled on a pair of rails 66 constitutes a section of molds.

Each of the rails 66 at one of its ends is provided with an offset portion 69. The offset portion 69 is a piece of tubing substantially similar to that of which the rail 66 is made and is preferably welded against the side of the rail 66. In assembling the rails 66 to the mold bases 62 the offset portions 69 are directed toward each other and are thus in a position to engage the inner surfaces of the next pair of rails 66 to prevent lateral relative movement between the sections of molds. The offset portions 69 are made of sufficient length to reach beneath the cross rail of the base 62 of the next adjacent mold and thus oppose any relative movement in a vertical direction between the ends of the sections of molds.

To prevent longitudinal disengagement of the sections of molds a hook 70 is pivotally mounted from a cross piece 71 of the base 62 of the first mold in one section in position to engage a cross member 72 of the last mold in the adjacent section of molds. The end of the hook 70 is beveled and the movement of the hook in its mounting is limited so that when the mold sections are being pushed together at the loading station the beveled end of the hook 70 engages and slides over the cross member 72 until the mold sections are fully engaged when it drops into position to latch the sections together. At the unloading station it is a simple matter to reach through the side frames of the mold frames and lift the hook 70 to disengage the sections.

The offset portions 69 of the rail 66 either considered alone or with the hook 70 constitute interengaging members for interconnecting the molds during their passage through the furnace. This interengagement between the mold sections eliminates the necessity of providing guide members extending throughout the length of the furnace and thus allows the use of a relatively simple conveyor structure.

Figures 21 to 24 inclusive illustrate another form of mold that is suitable for use in the improved furnace. This mold has a shaping surface 73 forming part of a frame 74 that conforms to the marginal area of a bent glass sheet. The frame 74 is carried in part on a base 75 and in part on uprights 76 erected from the base 75. The uprights 76 are each divided into two parts and connected by sleeves 77 to provide an adjustment as may be required to counteract warping of the mold. The base 75 of the mold is provided with a pair of converging rails 78 that extend a considerable distance beyond each end of the base 75. The convergence of the rails 78 (as shown in Figure 22) allows the narrow ends of the rails to be inserted between the spread apart ends of the rails 78 of an adjacent mold and to be wedged in contact with the rails 78 of the adjacent mold before mold bases 75 interfere with each other. The effectiveness of the interengagement of the rails 78 is enhanced because while the narrow ends of the rails extend beneath the base 75 of a preceding mold the spread apart ends of the rails of the preceding mold also pass beneath the base 75 of the following mold. This interengagement of the rails of each mold with the undersurface of the other mold prevents any vertical or lateral misalignment or disengagement of the molds.

Longitudinal disengagement is prevented by a hook 79 that is pivotally mounted in a U-shaped stirrup 80 extending forward from the center section of a cross piece 81 of each base 75. The U-shaped sections 80 are of sufficient length to abut the rear cross member 82 of the preceding mold when the hook 79 is ready to hook over the cross member 82. In this example, as in the first, the front end of the hook 79 is beveled and the movement of the hook 79 is limited by the U-shaped member 80 so that the hook automatically slides over and engages the cross bar of the preceding mold as the molds are pushed into engagement with each other.

The converging rails 78 may be used with or without the hooks 79 and may be said to constitute interengaging members of the molds for connecting the molds into an endless chain during their passage through the furnace. While it is generally preferable to rigidly interconnect a group of molds into a section as is shown in Figures 17 to 20 inclusive, it is in some instances, particularly with larger molds, desirable to provide each of the molds with converging rails as is shown in Figures 21 to 24.

The improved method of bending glass sheets and the improved furnace constructed according to the invention provide an economical continuous production method for bending glass sheets in the manufacture of bent glass windows.

Various modifications may be made to adapt the furnace and molds to the particular shapes of glass to be bent without departing from the spirit and scope of the invention.

We claim:

1. A method of bending selected portions of glass sheets while leaving other portions of said sheets substantially unbent comprising the steps of supporting the glass sheets in bending relation to the shaping surface of a mold, passing the mold through a heated chamber, heating the chamber by means of heat sources concentrated in a portion only of the chamber to produce parallel regions of different temperatures each extending generally along the path of the mold, and orienting the mold for passage through the chamber to position those portions of the glass sheets to be bent in the hotter region of the chamber and the portions which are not to be bent in the cooler region of the chamber.

2. A method of bending selected portions of glass sheets while leaving other portions of said sheets substantially unbent comprising the steps of supporting the glass sheets in bending relation to the shaping surface of a mold, passing the mold through a heated chamber, heating the chamber by means of heat sources positioned near the top of the chamber to produce a temperature variation from the bottom to the top of the chamber, and orienting the shaping surface of the mold during its passage through the chamber to locate the portions of glass to be bent in the upper part of the chamber and the portions which are not to be bent in the lower part of the chamber.

3. A method of bending glass sheets comprising the steps of supporting the glass sheets in bending relation to the shaping surface of a mold, passing the mold through a heated chamber, supplying heat to one region of the chamber and extracting heat from another region of the chamber to produce a temperature gradient extending generally transverse to the path of the mold, and orienting the mold for passage through the chamber to subject that portion of each glass sheet to be bent to a higher temperature than the remainder of the sheet.

4. A method of bending selected portions of glass sheets to a greater extent than other portions of said sheets comprising the steps of supporting the glass sheets in bending relation to the shaping surface of a mold, passing the mold through a heated chamber, supplying heat to one longitudinally extending region of the chamber to raise the temperature of that region over that of adjacent regions, and orienting the molds for passage through the chamber to always locate those portions of the moving glass sheets that are to be bent to a greater extent in the higher temperature region and to locate the other portions of said sheets in said adjacent regions.

5. A method of bending glass sheets comprising the steps of supporting the glass sheets in bending relation to the shaping surfaces of a plurality of molds, passing the molds through a heated chamber to heat the glass sheets carried on the molds, supplying additional heat to the glass sheets by moving said molds past a source of radiant heat in said chamber, and orienting the molds so that a portion of the glass sheet or sheets carried on one mold shields a portion of the glass carried on an adjacent mold from the heating effect of the radiant heat.

6. A method of bending glass sheets comprising the steps of supporting the glass sheets in bending relation to inclined shaping surfaces of a plurality of molds, passing the molds through a heated chamber to heat the glass sheets carried on the molds, supplying additional heat ot the glass sheets by directing radiant heat toward the glass sheets, and orienting the molds relative to each other to present the glass sheets to the radiant heat in shingled fashion, whereby a portion of the glass on one mold shields a different portion of the glass on another mold to confine the radiant heating to selected portions of the sheets.

7. An apparatus for bending glass sheets comprising, in combination, an elongated chamber, means for supplying heat to the upper part of the chamber to produce regions of different temperatures within the chamber, a series of movable molds arranged in abutting relationship within the chamber, each of the molds having a shaping surface that faces generally upwardly and forwardly of its direction of movement, a series of radiant heaters directed toward the shaping surfaces of the molds and means for moving the molds through the chamber.

8. An apparatus for bending glass sheets comprising, in combination, an elongated chamber, heating means in the upper part of the chamber, heat extracting means located in at least a portion of the lower part of the chamber, said means serving to produce regions of different temperatures in the atmosphere of the chamber, a removable mold for supporting the glass sheets with the portions to be bent extending into the hotter temperature region, and means for moving the mold through the chamber.

9. An apparatus for bending glass sheets comprising, in combination, an elongated chamber, heating means located in the upper part of the chamber, heat extracting means located in the lower part of the chamber, said means serving to produce a temperature gradient between regions of different temperatures, removable molds for supporting glass sheets with the portions to be bent in the hotter temperature region, and radiant heaters directed at the portion of the glass to be bent for elevating the temperature of that portion above the temperature of adjacent portions of the glass.

10. An apparatus for bending glass sheets comprising, in combination, a series of interconnected elongated chambers serving as a heating chamber, an annealing chamber and a cooling chamber, a series of power driven rollers forming a coveyor extending throughout the series of chambers, molds carried on the conveyor for carrying glass sheets through the chambers, baffles separating the chambers and defining openings through which the molds may pass, and electrically charged members ahead of each baffle which when touched by misaligned molds activate an alarm.

11. An apparatus for bending glass sheets comprising, in combination, an elongated heating chamber, means for heating said chamber, a series of movable molds arranged in abutting relationship within the furnace and having their bending surfaces lying at an angle between the horizontal and vertical with the lower edges of said surfaces in advance of the upper edges, and means for moving said molds in a continuous line through the chamber.

12. In apparatus for bending glass sheets, a bending mold adapted to be arranged in abutting relationship with other similar molds in a furnace, a shaping surface on said mold lying at an angle between the horizontal and vertical, and means on the mold interengaging with complemental means on adjacent molds when said mold is in abutting relationship with said adjacent molds and with its angled shaping surface substantially parallel with the angled shaping surfaces on the adjacent molds.

13. In apparatus for bending glass sheets, a bending mold adapted to be arranged in abutting relationship with similar molds in a furnace and comprising a base, uprights erected from said base, a frame having a shaping surface formed thereon and supported in an inclined position with the lowermost portion of said frame in contact with said base and with the other end of said frame carried on said uprights, and means on said base interengaging with means on adjacent similar molds when arranged in abutting relationship therewith.

14. In apparatus for bending glass sheets, a bending mold comprising a base, uprights erected from said base, a frame having a notched shaping surface formed thereon and supported in an inclined position with the lowermost portion of said frame in contact with said base and with the other end of said frame carried on said uprights, and a pair of horizontal converging rails carried by said base and adapted to interengage with complemental rails on adjacent molds when arranged in abutting relation therewith.

References Cited in the file of this patent

UNITED STATES PATENTS

| Number | Name | Date |
|---|---|---|
| 682,570 | Sage | Sept. 10, 1901 |
| 1,635,861 | Peiler | July 12, 1927 |
| 2,057,763 | Boyles et al. | Oct. 20, 1936 |
| 2,131,873 | Goodwillie | Oct. 4, 1938 |
| 2,167,318 | Verlay | July 25, 1939 |
| 2,215,228 | Oliver | Sept. 17, 1940 |
| 2,348,278 | Boyles et al. | May 9, 1944 |
| 2,608,030 | Jendrisak | Aug. 26, 1952 |